Patented Aug. 10, 1943

2,326,369

UNITED STATES PATENT OFFICE 2,326,369

PREPARATION AND USE OF SUGAR REFINING ADSORBENT

William A. La Lande, Jr., Upper Darby, Pa., assignor to Porocel Corporation, Philadelphia, Pa., a corporation of Delaware No Drawing. Application May 13, 1942, Serial No. 442,866

6 Claims. (Cl. 127—55)

The present invention relates to the preparation and use of an improved bauxite adsorbent for refining sugar solutions, and more particularly a bauxite adsorbent which does not lower the pH of sugar solutions refined therewith.

It has been found that calcined bauxites, especially those which have been calcined at temperatures above 1000° F., and to a lesser extent those which have been calcined between 600° F. and 1000° F., when employed in the refining of sugar solutions tend to lower the pH of such solutions. The lowering of the pH is undesirable, since the lower the pH of the solution, the more rapidly will it deteriorate through inversion on subsequent heating, evaporation, and storage.

I have discovered that the above mentioned difficulty may be overcome by subjecting the bauxite to treatment with ammonia, the ammonia being removed from the treated bauxite prior to its use in the refining of the sugar solutions.

In accordance with my invention, bauxite in the form of granules or fines, either calcined or uncalcined, may be treated with an aqueous solution of ammonia at ordinary or elevated temperatures, and the ammonia then removed, after which the treated bauxite is calcined at a temperature between 500° F. and 1600° F. prior to use. For example, the bauxite may be soaked in ammonia water having a concentration of 2% to 30% of ammonia for a period ranging from a few hours to several days. The soaking period is governed primarily by the concentration of the ammonia solution, the weaker the solution, the longer is the required soaking period. Upon completion of the soaking period, the ammonia solution is drained from the bauxite, and the latter is washed with water to remove adsorbed or absorbed ammonia. The washed bauxite is then dried and calcined at a temperature between 500° F. and 1600° F., and preferably between 600° F. and 900° F. If desired, the water washing may be dispensed with, and the bauxite containing adsorbed or absorbed ammonia may be dried and calcined as above described, provision being made for the recovery of the ammonia driven off during the drying and calcination steps.

The temperature at which the ammonia treatment is made is preferably above room temperature, and if such temperature is sufficiently high to cause excessive loss of ammonia from the mixture, a stream of ammonia gas may be bubbled through the mixture, or a superatmospheric pressure may be employed to retain the ammonia in the mixture during treatment.

As an alternate method of treating, the bauxite may be treated with ammonia gas at elevated temperatures, for example, at temperatures between 400° F. and 1200° F., preferably in the presence of water vapor. The pressure employed in this treatment may range from atmospheric to several hundred pounds per square inch, the duration of the treatment depending upon the temperature, pressure, and particle size of the bauxite. Any ammonia which may remain in the treated bauxite may be removed by water washing followed by calcination, or simply by calcination at atmospheric or reduced pressure.

In utilizing the improved bauxite for refining sugar solutions, the granular bauxite is charged to the filter, and the sugar solution is percolated through the bauxite until the refining efficiency of the latter decreases to such a point that it becomes impractical to continue the filtration. The bauxite in the filter is then washed with water to remove residual sugar, and ammonia solution is added to the filter and allowed to percolate through the bauxite until ammonia appears in the effluent. The filter is then shut in and permitted to stand, for example, for a period of 6 to 24 hours. The ammonia solution is then run off to storage, and may be repeatedly used since the ammonia is not consumed in the treatment of the bauxite. After the ammonia solution has been run off, the filter is washed with water, and the bauxite is then ready for drying and regeneration by calcination. In lieu of employing ammonia solution for the treatment of the bauxite in the filter, ammonia gas may be used. The gas is admitted to the filter after the initial washing for the removal of residual sugar is completed, and when the test for ammonia at the bottom valve of the filter is positive, the filter is shut in as before. Upon completion of the treating period the ammonia is removed from the bauxite by water washing, and the bauxite is then dried and regenerated by calcination. The bauxite, of course, must be removed from the filter in order to subject it to regeneration by calcination.

While the sugar refining treatment has been described above particularly with reference to the use of granular bauxite, it is also possible to employ bauxite fines for such refining treatment. For example, bauxite of 100 mesh or finer may be subjected to the ammonia treatment by any of the methods hereinbefore described, and the treated fines may be intimately mixed or contacted with the sugar solution in order to obtain the desired refining effect, i. e., decolorization, ash removal, etc. The refined solution may then be filtered to remove the bauxite fines containing the impurities removed from the sugar solution. The fines may be water washed and regenerated by calcination, with or without an intermediate treatment with ammonia.

A variety of sugars or sugar solutions may be refined by treatment with my improved bauxite, including solutions of raw cane or beet sugar, sugar refinery wash syrups, sugar liquors, molasses, sweet potato syrup, corn syrup, and the like. In all cases, the refining with the improved bauxite is accomplished with substantially no lowering of the pH of the sugar solutions.

My invention may be further illustrated by the following examples, which are not to be construed as limiting the scope thereof:

1. 500 parts by weight of 10/30 mesh bauxite (volatile matter content 30% by weight) was placed in a treating vessel and covered with 254 parts by weight of aqueous ammonia of 20% concentration. The bauxite was permitted to soak at room temperature for 30 hours, after which the ammonia solution was drained off. The bauxite was then washed with water to remove residual ammonia, dried, and calcined at 750° F. for 30 minutes. The calcined bauxite was placed in a filter and a washed sugar liquor having a pH 6.7 was percolated therethrough to yields of 2, 4 and 6 lbs. of sugar solids per lb. of bauxite. After the first use, the bauxite was regenerated by water washing and calcination at 800° F. for 30 minutes, and then reused, after which the cycle was repeated a third time. The following table gives the results obtained with both the ammonia-treated bauxite and the untreated bauxite prepared simply by calcination at 750° F. for 30 minutes.

WASHED SUGAR LIQUOR—pH 6.7

*Filtrate pH at various yields*

| Yields, lbs. sugar solids per lb. of bauxite | Ammonia-treated bauxite | | | Untreated bauxite | | |
|---|---|---|---|---|---|---|
| | 1st use | 2d use | 3d use | 1st use | 2d use | 3d use |
| 2 | 7.0 | 6.9 | 6.9 | 6.2 | 6.1 | 6.0 |
| 4 | 7.0 | 7.0 | 6.9 | 6.0 | 6.0 | 5.9 |
| 6 | 6.9 | 6.8 | 6.8 | 6.0 | 6.0 | 6.0 |

2. A quantity of 10/30 mesh bauxite was heated at 800° F. for 1 hour in a stream of ammonia gas and water vapor (ratio 10:1) at atmospheric pressure. The ammonia stream was then turned off, and the bauxite was permitted to cool in a current of air. The treated bauxite was washed with water, dried, and calcined at 750° F. for 30 minutes. A quantity of the calcined bauxite was placed in a filter, and washed sugar liquor having a pH of 6.9 was percolated therethrough to a yield of 2.5 lbs. of sugar solids per lb. of bauxite. The pH of the filtrate, at this yield, was 6.9. Washed sugar liquor, when percolated under the same conditions through untreated bauxite prepared simply by calcination at 750° F. for 30 minutes, had a pH of 6.3.

From the above examples, it will be evident that the use of ammonia-treated bauxite permits the refining of sugar solutions without lowering the pH of the solution, whereas untreated bauxite used with the same sugar solution produces a substantial and undesirable lowering of the pH.

I claim:

1. The method of preparing bauxite adapted for the refining of sugar solution without lowering the pH of said solution, which comprises contacting the bauxite with ammonia, and calcining the treated bauxite at a temperature between 500° F. and 1600° F.

2. The method of preparing bauxite adapted for the refining of sugar solution without lowering the pH of said solution, which comprises contacting the bauxite with ammonia, removing the ammonia from the treated bauxite, and calcining the treated bauxite at a temperature between 500° F. and 1600° F.

3. The method of preparing bauxite adapted for the refining of sugar solution without lowering the pH of said solution, which comprises contacting the bauxite with ammonia at a temperature between 400° F. and 1200° F., removing the ammonia from the treated bauxite, and calcining the treated bauxite at a temperature between 500° F. and 1600° F.

4. The method of preparing bauxite adapted for the refining of sugar solution without lowering the pH of said solution, which comprises contacting the bauxite with an aqueous solution of ammonia, removing the ammonia from the treated bauxite, and calcining the treated bauxite at a temperature between 500° F. and 1600° F.

5. The method of refining a sugar solution, which comprises contacting said solution with bauxite which has been contacted with ammonia and calcined at a temperature between 500° F. and 1600° F., and separating the bauxite from the refined sugar solution.

6. The method of refining a sugar solution, which comprises filtering said solution through granular bauxite which has been contacted with ammonia and calcined at a temperature between 500° F. and 1600° F.

WILLIAM A. LA LANDE, JR.